(12) United States Patent
Helber et al.

(10) Patent No.: US 6,699,629 B1
(45) Date of Patent: Mar. 2, 2004

(54) PROCESS SURVIVABLE INDICIA ON FOAM CORE IMAGING SUPPORTS

(75) Inventors: Margaret J. Helber, Rochester, NY (US); Peter T. Aylward, Hilton, NY (US); Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/327,735

(22) Filed: Dec. 23, 2002

(51) Int. Cl.[7] .................... G03C 1/765; G03C 11/02; G03G 5/10; C04B 41/00; B41J 3/407
(52) U.S. Cl. .................... 430/22; 430/200; 430/201; 430/60; 430/496; 430/536; 264/132; 347/106; 428/314.4; 428/315.9; 503/227
(58) Field of Search ........................ 430/60, 22, 200, 430/201, 496, 536; 503/227; 347/106; 428/314.4, 315.5, 315.9; 264/132

(56) References Cited

U.S. PATENT DOCUMENTS

| 4,832,775 A | 5/1989 | Park et al. | |
|---|---|---|---|
| 5,851,651 A | 12/1998 | Chao | |
| 5,866,282 A | 2/1999 | Bourdelais et al. | 430/536 |
| 6,007,665 A * | 12/1999 | Bourdelais et al. | 430/536 |
| 6,447,976 B1 | 9/2002 | Dontula et al. | 430/536 |
| 6,514,659 B1 * | 2/2003 | Dontula et al. | 430/536 |

FOREIGN PATENT DOCUMENTS

| JP | 09106038 A | 4/1997 |
|---|---|---|
| JP | 09127648 A | 5/1997 |
| JP | 2839905 B2 | 12/1998 |

* cited by examiner

*Primary Examiner*—Richard L. Schilling
(74) *Attorney, Agent, or Firm*—Lynne M. Blank

(57) ABSTRACT

The present invention relates to a method for placing process survivable indicia on a support for an imaging element comprising providing a support wherein the support comprises a closed cell foam core and adhered thereto at least one flange layer, wherein the closed cell foam core layer comprises a polymer that has been expanded through the use of a blowing agent, and placing process survivable ink on at least one flange layer, wherein the process survivable ink forms process survivable indicia. The invention also relates to a method for placing process survivable indicia on a support comprising a closed cell foam core and adhered thereto an upper flange layer and a lower flange layer. The invention also includes a method for placing process survivable indicia on a support by placing process survivable indicia on said closed cell foam core.

61 Claims, No Drawings

PROCESS SURVIVABLE INDICIA ON FOAM CORE IMAGING SUPPORTS

CROSS REFERENCE TO RELATED APPLICATIONS

Reference is made to commonly assigned, co-pending U.S. patent applications: Ser. No. 11/328,547 by Helber et al. filed of even date herewith entitled "Embossed Indicia On Foam Core Imaging Media"; and Ser. No. 10/328,335 by Helber et al. filed of even date herewith entitled "Indicia On Foam Core Support Media", the disclosures of which are incorporated herein.

FIELD OF THE INVENTION

The present invention relates to a method of placing process survivable indicia on foam core supports.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance.

In addition to these fundamental requirements, imaging supports are also subject to other specific requirements depending upon the mode of image formation onto the support. For example, in the formation of photographic paper, it is important that the photographic paper be resistant to penetration by liquid processing chemicals, failing which, a stain appears on the print border accompanied by a severe loss in image quality. In the formation of 'photo-quality' ink jet paper, it is important that the paper is readily wetted by ink and that it exhibits the ability to absorb high concentrations of ink and dry quickly. If the ink is not absorbed quickly, the elements block (stick) together when stacked against subsequent prints and exhibit smudging and uneven print density. For thermal media, it is important that the support contain an insulative layer in order to maximize the transfer of dye from the donor, which results in a higher color saturation.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. For example, it is known that a conventional photographic paper comprises a cellulose paper base or support that has applied thereto a layer of polyolefin resin, typically polyethylene, on each side, which serves to provide waterproofing to the paper and also provides a smooth surface on which the photosensitive layers are formed. In U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments such as titanium dioxide above and below the microvoided layer. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create 'photo-quality' ink jet paper.

In all of the above imaging supports, multiple operations are required to manufacture and assemble the individual layers into a support. For example, photographic paper typically requires a paper-making operation, followed by a polyethylene extrusion coating operation, or as disclosed in U.S. Pat. No. 5,866,282, a paper-making operation, followed by a lamination operation for which the laminates are made in yet another extrusion casting operation. There is a need for imaging supports that may be manufactured in a single in-line manufacturing process while still meeting the stringent features and quality requirements of imaging bases or supports.

It is also well known in the art that traditional imaging bases consist of raw paper base/support. For example, in typical photographic paper as currently made, approximately 75% of the weight of the photographic paper comprises the raw paper base. Although raw paper base is typically a high modulus, low cost material, significant environmental issues exist with the paper manufacturing process. There is a need for alternate raw materials and manufacturing processes that are more environmentally friendly. Additionally to minimize environmental impact, it is important to reduce the raw paper base content, where possible, without sacrificing the imaging base features that are valued by the customer, that is, strength, stiffness, and surface properties of the imaging support.

An important corollary of the above is the ability to recycle photographic paper. Current photographic papers cannot be recycled, because they are composites of polyethylene and raw paper base and, as such, cannot be recycled using polymer recovery processes or paper recovery processes. A photographic paper that comprises significantly higher contents of polymer lends itself to recycling using polymer recovery processes.

Existing composite color paper structures are typically subject to curl through the manufacturing, finishing, and processing operations. This curl is primarily due to internal stresses that are built into the various layers of the composite structure during manufacturing and drying operations, as well as during storage operations (core-set curl). Additionally, since the different layers of the composite structure exhibit different susceptibility to humidity, the curl of the imaging base changes as a function of the humidity of its immediate environment. There is a need for an imaging support that minimizes curl sensitivity as a function of humidity, or ideally, does not exhibit curl sensitivity.

The stringent and varied requirements of imaging media, therefore, demand a constant evolution of material and processing technology. One such technology, known in the art as 'polymer foams', has previously found significant application in food and drink containers, packaging, furniture, and appliances. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to the major surface of the polystyrene foam substrate. The foregoing composite foam/film structure may be shaped by conventional processes, such as thermoforming, to provide numerous types of useful articles including cups, bowls, and plates, as well as cartons and containers that exhibit excellent levels of puncture, flex-crack, grease and abrasion resistance, moisture barrier properties, and resiliency.

Foams have also found limited application in imaging media. For example, JP 2839905 B2 discloses a 3-layer structure comprising a foamed polyolefin layer on the image-receiving side, raw paper base, and a polyethylene resin coat on the backside. The foamed resin layer was created by extruding a mixture of 20 weight % titanium dioxide master batch in low density polyethylene, 78 weight % polypropylene, and 2 weight % of Daiblow PE-M20 (AL)NK blowing agent through a T-die. This foamed sheet was then laminated to the paper base using a hot melt adhesive. The disclosure JP 09127648 A highlights a variation of the JP 2839905 B2 structure, in which the resin on the backside of the paper base is foamed, while the image receiving side resin layer is unfoamed. Another variation is a 4-layer structure highlighted in JP 09106038 A. In this, the image receiving resin layer comprises 2 layers, an unfoamed resin layer which is in contact with the emulsion, and a foamed resin layer which is adhered to the paper base. There are several problems with this, however. Structures described in the foregoing patents need to use foamed layers as thin as 10 μm to 45 μm, since the foamed resin layers are being used to replace existing resin coated layers to the paper base. The thickness restriction is further needed to maintain the structural integrity of the photographic paper base since the raw paper base is providing the stiffness. It is known by those versed in the art of foaming that it is very difficult to make thin uniform foamed films with substantial reduction in density especially in the thickness range noted above.

In an imaging media, it is important to build and maintain brand identification. In traditional resin coated paper that is used for photographic prints and displays, it is known to print the paper core with an ink to provide brand identity for the consumer. It is important to the consumer to know that they are buying a high quality paper for their imaging prints. While resin coated paper is very useful and has provided the consumer with good quality prints for many year, there remains a need for an all synthetic imaging support that may be used for prints. Resin coated paper provides a means of placing indicia on the paper core and then applying a layer of polymer such as polyethylene over top of it. The layer of polyethylene provides a means to protect the ink from processing chemistry such as low and high pH materials. The polyethylene layer provides a barrier to the processing solution and prevents it from acting on the inks. The paper core is sized with materials that minimize the penetration of the photo chemistry into the paper structure.

When working with an imaging element made from a closed cell foamed polymer having flange layers, it may be more difficult to provide the same level of opacity as with resin coated paper. In these cases, it may be necessary to place the indicia on the backside of the imaging element. In this case the opacity is provided by a pigmented upper flange layer, the closed cell foam core with may also contain pigments and the back side flange which also is pigmented. In conventional resin coated paper the opacity observed from the image side comes only from the front side resin layer and the paper. In this instance, the ink may be directly in contact with the processing chemistry or, at best, coated over with a sub-micron thickness of antistatic layer that may offer little resistance to the pH conditions in photoprocessing and which is permeable processing solutions. With the ink exposed to the processing solutions, the selection of materials that may be used is limited. Problems such as swelling of the polymer binder may cause the ink to soften and lose adhesion to the base. With physical abrasion in the processing equipment, the ink may fall off and contaminate the processing solutions. Additionally, the dye and pigments may be removed and cause the printed indicia to be less visible or even unreadable. Achieving adhesion to a polymer surface presents one level of complexity, but being able to find an ink binder that will not only adhere in a dry state but can resist the chemical intrusion of both acid and basic solutions, while still maintaining ink density and scratch protection, is a much higher level of complexity.

There remains a need for a printable composite material that can be manufactured in a single in-line operation and that meets all the requirements of an imaging support. There also remains a need for a printable imaging support that reduces the amount of raw paper support that is used. There remains a need for a printable imaging support that can be effectively recycled. There is also a need for an imaging support that resists the tendency to curl as a function of ambient humidity. There is also a need for a printable imaging support that may be marked with process survivable indicia.

SUMMARY OF THE INVENTION

The present invention relates to a method for placing process survivable indicia on a support for an imaging element comprising providing a support wherein the support comprises a closed cell foam core and adhered thereto at least one flange layer, wherein the closed cell foam core layer comprises a polymer that has been expanded through the use of a blowing agent, and placing process survivable ink on at least one flange layer, wherein the process survivable ink forms process survivable indicia. The invention also relates to a method for placing process survivable indicia on a support for an imaging element comprising providing a support comprising a closed cell foam core sheet and adhered thereto at least one flange layer and placing indicia on the closed cell foam core sheet and a method for placing process survivable indicia on a support for an imaging element comprising providing a support wherein the support comprises a closed cell foam core and adhered thereto an upper flange layer and a lower flange layer, wherein the closed cell foam core comprises a polymer that has been expanded through the use of a blowing agent, and placing process survivable indicia on at least one of the upper and lower flange layers. The invention also includes a method for placing process survivable indicia on a support for an imaging element comprising providing a support comprising a support wherein said support comprises a closed cell foam core sheet and adhered thereto at least one flange layer, wherein said closed cell foam core sheet comprises a polymer that has been expanded through the use of a blowing agent, and placing process survivableindicia on said closed cell foam core.

ADVANTAGEOUS EFFECT OF THE INVENTION

This invention provides a superior imaging support and overcomes the disadvantages of prior imaging support. Specifically, it provide advantages with respect to an imaging support that may be marked with process survivable indicia on the outer layer of an imaging element or layer which can be reached by processing solutions. Further advantages of the invention may include an imaging element with high stiffness, excellent smoothness, high opacity, and excellent humidity curl resistance. Another advantage provided by an imaging support produced by the invention is the ability to manufacture the element using a single in-line operation. In another advantage, the imaging support can be effectively recycled.

DETAILED DESCRIPTION OF THE INVENTION

The method of the invention produces an element that has a process-surviving indicia that may be placed on the outer most layer of an imaging element or under layers which are permeable to processing solutions. Preferably the indicia comprises process-survivable ink. Such an ink is resistant to the effects of chemical processing as encountered in photographic processing. Furthermore, the element has much less tendency to curl when exposed to extremes in humidity. The element may be manufactured in a single in-line operation. This significantly lowers element manufacturing costs and would eliminate disadvantages in the manufacturing of the current generation of imaging supports including very tight moisture specifications in the raw support. The element may also be recycled to recover and reuse polyolefin instead of being discarded into landfills. This invention uses closed cell foam at the core of the imaging support, with high modulus flange layers that provide the needed stiffness surrounding the closed cell foam core, most preferably on either side.

Using this approach, many new features of the imaging support may be exploited and restrictions in manufacturing eliminated. The present invention may provide an imaging media which builds and maintains brand identification. The present invention may prevent swelling of the ink polymer binder, which causes the ink to soften and lose adhesion to the base. The present invention also may prevent physical abrasion in the processing equipment, wherein the ink falls off and contaminates the processing solutions or removal of the dye and pigments, which causes the printed indicia to be less visible or even unreadable. Achieving adhesion to a polymer surface presents one level of complexity, but being able to find an ink binder that will not only adhere in a dry state but can resist the chemical intrusion of both acid and basic solutions, while still maintaining ink density and scratch protection, is a much higher level of complexity. The inks used with this invention provide excellent resistance to photographic processing solution and also provide good scratch protection.

The present invention relates to a method for placing process survivable indicia on a support for an imaging element comprising providing a support wherein the support comprises a closed cell foam core and adhered thereto at least one flange layer, wherein the closed cell foam core layer comprises a polymer that has been expanded through the use of a blowing agent.

The imaging member useful with the invention comprises a closed cell polymer foam core that has adhered thereto at least one flange layer, most preferably, an upper and a lower flange layer. The closed cell polymer foam core comprises a homopolymer such as a polyolefin, polystyrene, polyvinylchloride or other typical thermoplastic polymers; their copolymers or their blends thereof; or other polymeric systems like polyurethanes, polyisocyanurates that has been expanded through the use of a blowing agent to consist of two phases, a solid polymer matrix, and a gaseous phase. Other solid phases may be present in the foams in the form of fillers that are of organic (polymeric, fibrous) or inorganic (glass, ceramic, metal) origin. The fillers may be used for physical, optical (lightness, whiteness, and opacity), chemical, or processing property enhancements of the foam.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents, generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention polyolefins such as polyethylene and polypropylene, their blends and their copolymers are used as the matrix polymer in the closed cell foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis (benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, and azodicarbonamide, though others may also be used. If necessary, these foaming agents may be used together with an auxiliary foaming agent, nucleating agent, and a cross-linking agent.

The flange layers used with this invention are chosen to satisfy specific requirements of flexural modulus, caliper, surface roughness, and optical properties, such as colorimetry and opacity. Preferably, the flange layers have a modulus greater than the modulus of the closed cell foam core. In one embodiment, the flange layer preferably has an opacity greater than 90 percent. In another preferred embodiment, the flange layer has an opacity of from 80 to 99 percent. In an additional embodiment of this invention, the flange layer may comprise pigment. Talc is a useful pigment in this invention, because it not only provides a degree of opacity over non-pigmented flange layers but it also helps to provide added stiffness to the flange layer. Titanium dioxide is also a useful pigment in the embodiments of this invention. Titanium dioxide is very white and has a high refractive index that helps to add to the opaqueness of the imaging element.

The flange layers may be formed integrally with the closed cell foam core by manufacturing the closed cell foam core with a flange layer skin sheet or the flange layer may be laminated to the closed cell foam core material. The integral extrusion of flange layers with the core is preferred for cost. The lamination technique allows a wider range of properties and materials to be used for the skin materials. Imaging elements are constrained to a range in stiffness and caliper. At stiffness below a certain minimum stiffness, there is a problem with the element in print stackability and print conveyance during transport through photofinishing equipment, particularly high speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important that the caliper of the imaging element be constrained from 75 $\mu$m to 350 $\mu$m for the same transport reasons through photofinishing equipment.

Imaging elements are typically constrained by consumer performance and present processing machine restrictions to a stiffness range of from approximately 50 mN to 250 mN and a caliper range of from approximately 100 μm to 400 μm. In the design of the element used with the invention, there exists a relationship between stiffness of the imaging element and the caliper and modulus of the closed cell foam core and modulus of the flange layer, that is, for a given core thickness, the stiffness of the element may be altered by changing the caliper of the flange layers and/or changing the modulus of the flange layers and/or changing the modulus of the closed cell foam core.

If the target overall stiffness and caliper of the imaging element are specified then for a given core thickness and core material, the target caliper and modulus of the flange layers are implicitly constrained. Conversely, given a target stiffness and caliper of the imaging element for a given caliper and modulus of the flange layers, the core thickness and core modulus are implicitly constrained.

Preferred ranges of closed cell foam core caliper and modulus and flange layer caliper and modulus follow: the preferred caliper of the closed cell foam core used with the invention ranges from 25 μm to 350 μm, the caliper of the polymer flange layers used with the invention ranges from 10 μm to 175 μm, the modulus of the closed cell foam core used with the invention ranges from 30 MPa to 1000 MPa, and the modulus of the flange layers used with the invention ranges from 700 MPa to 10500 MPa. In an embodiment of this invention, the preferred polymer flange layer has a thickness of from 35 micrometers to 70 micrometers. Below 35 micrometers the flange layer impact on stiffness is limited while thickness above 70 micrometers are more costly and have limited value. In a preferred embodiment, the closed cell foam core has a thickness of from 25 to 350 μm.

In a useful embodiment the support has a thickness of from 100 to 400 micrometers. Such a support provides good stiffness and feel. In each case, the above range is preferred because of (a) consumer preference, (b) manufacturability, and (c) materials selection. It is noted that the final choice of flange layer and core materials, modulus, and caliper will be a subject of the target overall element stiffness and caliper.

The selection of core material, the extent of density reduction (foaming), and the use of any additives/treatments for, for example, cross-linking the foam, determine the closed cell foam core modulus. The selection of flange layer materials and treatments (for example, the addition of strength agents for paper base or the use of filler materials for polymeric flange layer materials) determines the flange layer modulus.

For example, at the low end of target stiffness (50 mN) and caliper (100 μm), given a typical polyolefin foam of caliper 50 μm and modulus 137.9 MPa, the flange layer caliper is then constrained to 25 μm on each side of the core, and the flange layer modulus required is 10343 MPa, properties that may be met using a high modulus paper support. Also, for example, at the high end of target stiffness (250 mN) and caliper (400 μm), given a typical polyolefin foam of caliper 300 μm and modulus 137.9 MPa, the flange layer caliper is constrained to 50 μm on each side and the flange layer modulus required is 1034 MPa, properties that may be met using a polyolefin flange layer. In a preferred embodiment, the polymer flange layers comprise a caliper from 10 μm to 150 μm. In a more preferred embodiment, the polymer flange layers comprise a caliper from 35 μm to 70 μm.

In a preferred lamination embodiment of this invention, the flange layers used comprise paper. The paper used in this invention may be made on a standard continuous fourdrinier wire machine or on other modem paper formers. Any pulps known in the art to provide paper may be used in this invention. Bleached hardwood chemical kraft pulp is preferred, as it provides brightness, a good starting surface, and good formation while maintaining strength. Paper flange layers useful to this invention are of caliper from 25 μm to 100 μm, preferably from 30 μm to 70 μm, because the overall element thickness is in the range preferred by customers for imaging element and processes in existing equipment.

Chemical additives to impart hydrophobicity (sizing), wet strength, and dry strength may be used as needed. Inorganic filler materials such as titanium dioxide, talc, and $CaCO_3$ clays may be used to enhance optical properties and reduce cost as needed. Dyes, biocides, and processing chemicals may also be used as needed. The paper may also be subject to smoothing operations such as dry or wet calendering, as well as to coating through an in-line or an off-line paper coater.

In a preferred embodiment, the upper flange layer comprises paper. In another preferred embodiment, the lower flange layer comprises paper. In another preferred embodiment, the upper flange layer comprises paper and the lower flange layer comprises paper. In a preferred element containing paper, the weight of the imaging element preferably comprises less than 75% by weight of raw paper. In another preferred embodiment, the weight of the element may comprise less than 50% by weight of raw paper.

In another preferred lamination embodiment of this invention, the flange layers used comprise high modulus polymers such as high density polyethylene, polypropylene, or polystyrene, and their blends or their copolymers, that have been stretched and oriented. In a preferred embodiment, the flange layers comprise polymer layers. In another preferred embodiment, the polymeric flange layer may be an oriented layer. In another preferred embodiment, the polymer layers may comprise biaxially oriented polyolefin layers.

The polymeric flange layers may be filled with suitable filler materials as to increase the modulus of the polymer and enhance other properties such as opacity and smoothness. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, and polyester fibers. The preferred fillers are talc, mica, and calcium carbonate because they provide excellent modulus-enhancing properties.

The elements used in the invention may be made using several different manufacturing methods. The coextrusion, quenching, orienting, and heat setting of the element may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the closed cell foam core component of the element and the polymeric integral flange layer components are quenched below their glass solidification temperature. The flange layer components may be extruded through a multiple stream die with the outer flange layer forming polymer streams not containing foaming agent. Alternatively, the surface of the foaming agent containing polymer may be cooled to prevent surface foaming and form a flange layer. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining, to some degree, the sheet against retraction in both directions of stretching.

The present invention comprises placing process survivable ink on at least one flange layer, wherein the process survivable ink forms process survivable indicia. The process survivable ink comprises at least one pigment and at least one polymeric binder. In one preferred embodiment, the hydrophobicity of the binder of conventional printing ink is increased. In a preferred embodiment, the polymeric binder comprises 20–90 weight percent recurring monomer units derived from oleophilic monomers. In another preferred embodiment, the oleophilic monomers comprise alpha, beta-ethylenically unsaturated hydrocarbon groups, wherein the recurring oleophilic monomer units comprise alkylene side chains having greater than 4 carbon atoms. In another embodiment, the oleophilic binder to pigment weight percent ratio may be preferably greater than 90:10.

In another preferred embodiment, the conventional ink may be made process survivable by increasing the binder to pigment ratio. In a preferred embodiment, the binder to pigment weight percent ratio is greater than 95:5.

The polymeric binder of the inks used in this invention is derived from colloidal dispersions of hydrophobic polymers and are generally lattices or hydrophobic polymers of any composition that may be stabilized in a water based medium. Such hydrophobic polymers are generally classified as either condensation or addition polymers. Condensation polymers include, for example, polyesters, polyamides, polyurethanes, polyureas, polyethers, polycarbonates, polyacid anhydrides, and polymers comprising combinations of the above mentioned types. Addition polymers are polymers formed from polymerization of vinyl type monomers including, for example, allyl compounds, vinyl ethers, vinyl esters, vinyl heterocyclic compounds, styrenes, olefins and halogenated olefins, unsaturated acids and esters derived from them, unsaturated nitriles, vinyl alcohols, acrylamides and methacrylamides, vinyl ketones, multifunctional monomers, or copolymers formed from various combinations of these monomers. Such latex polymers may be prepared in aqueous media using well-known free radical emulsion polymerization methods and may consist of homopolymers made from one type of the above mentioned monomers, or copolymers made from more than one type of the above mentioned monomers. Polymers comprising monomers which form water insoluble homopolymers are preferred, as are copolymers of such monomers. Preferred polymers may also comprise monomers which give water soluble homopolymers, if the overall polymer composition is sufficiently water insoluble to form a latex. The aqueous phase of the latex or colloidal dispersions used in the invention may contain water-soluble polymers in order to control, for example, the viscosity and flow characteristics. The aqueous phase may also include surfactants of the cationic, anionic, zwitterionic or nonionic types.

In a preferred embodiment, the polymeric binder of the inks may comprise recurring monomer units derived from oleophilic monomers. The term "oleoplilic monomers" as used herein refers to alpha, beta-ethylenically unsaturated hydrocarbon group-containing monomers. Exemplary oleophilic monomers include acrylic esters, vinyl ether and styrene monomers such as methyl acrylate, methyl methacrylate, ethyl acrylate, n-butyl acrylate, benzyl acrylate, n-hexyl methacrylate, 2-ethylhexyl methacrylate, methyl vinyl ether, styrene, chlorostyrene, and vinyltoluene.

The element, while described as having preferably at least three layers of a closed cell foam core and a flange layer on each side, may also be provided with additional layers that may serve to change the properties of the element. Imaging elements could be formed with surface layers that would provide an improved adhesion or look. In one preferred embodiment, the element may further comprise polyethylene resin coatings on each side of the support, in contact with the flange layers and separated from the core by the flange layers. It is intended that the process survivable indicia be placed on the surface of the imaging element used in the present invention and, as a result, are exposed to process solutions. In the event that an overcoat, that is, layers placed on top of the indicia, is desired, the overcoat layer or layers are permeable to processing solutions and may allow the solutions to contact the process survivable indicia. For example, an antistatic layer, permeable to processing solutions, may be coated over the process survivable indicia.

These elements may be coated or treated after the coextrusion and orienting process or between casting and full orientation with any number of coatings which may be used to improve the properties of the sheets including to provide a vapor barrier, to make them heat sealable, or to improve the adhesion to the support or to the photosensitive layers. Examples of this would be coating polyvinylidene chloride for heat seal properties. Further examples include flame, plasma, or corona discharge treatment to improve printability or adhesion.

The element may also be made through the extrusion laminating process. Extrusion laminating is carried out by bringing together the paper or polymeric flange layers used with the invention and the closed cell foam core with application of an adhesive between them, followed by their being pressed in a nip between two rollers. The adhesive may be applied to either the flange layers or the closed cell foam core prior to their being brought into the nip. In a preferred form, the adhesive is applied into the nip simultaneously with the flange layers and the closed cell foam core. The adhesive may be any suitable material that does not have a harmful effect upon the element. A preferred material is polyethylene that is melted at the time it is placed into the nip between the closed cell foam core and the flange layer.

Addenda may also be added to the adhesive layer. Any know material used in the art to improve the optical performance of the system may be used. The use of titanium dioxide is preferred. During the lamination process, it is desirable to maintain control of the tension of the flange layers in order to minimize curl in the resulting laminated receiver support.

The suitable range in caliper of the closed cell foam core is from 25 $\mu$m to 350 $\mu$m. The preferred caliper range is from 50 $\mu$m to 200 $\mu$m because of the preferred overall caliper range of the element which lies from 100 $\mu$m to 400 $\mu$m. The range in density reduction of the closed cell foam core is from 20% to 95%. The preferred range in density reduction is from 40% to 70%. This is because it is difficult to manufacture a uniform product with very high density reduction (over 70%). Density reduction is the percent difference between solid polymer and a particular foam sample. It is also not economical to manufacture a product with density reduction less than 40%.

In another embodiment of this invention, the flange layers used comprise paper on one side and a high modulus polymeric material on the other side. In another embodiment, an integral skin (flange layers) may be on one side and another skin laminated to the other side of the closed cell foam core. In a preferred embodiment, the upper flange layer comprises paper. In another embodiment, the lower flange layer comprises paper. In yet another embodiment, the upper flange layer and lower flange layers comprise paper.

The caliper of the paper and of the high modulus polymeric material is determined by the respective flexural modulus such that the overall stiffness of the imaging element lies within the preferred range, and the bending moment around the central axis is balanced to prevent excessive curl.

In addition to the stiffness and caliper, an imaging element needs to meet constraints in surface smoothness and optical properties such as opacity and colorimetry. Surface smoothness characteristics may be met during flange-layer manufacturing operations such as during paper making or during the manufacture of oriented polymers like oriented polystyrene. Alternatively, surface smoothness may be met by extrusion coating additional layer(s) of polymers, such as polyethylene, onto the flange layers in contact with a textured chill-roll or similar technique known by those skilled in the art. In one embodiment, the upper surface of the support has an average roughness of from 0.1 $\mu$m to 1.1 $\mu$m.

Optical properties such as opacity and colorimetry may be met by the appropriate use of filler materials such as titanium dioxide, calcium carbonate and colorants, dyes and/or optical brighteners or other additives known to those skilled in the art. The fillers may be in the flange layer or an overcoat layer, such as polyethylene. Generally, support materials for color print imaging materials are white, possibly with a blue tint, as a slight blue is preferred to form a prefefred white look to whites in an image. Any suitable white pigment may be incorporated in the polyolefin layer such as, for example, titanium dioxide, zinc oxide, zinc sulfide, talc, clays, calcium carbonate,zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the flange layer or resin coat layers. The preferred pigment is titanium dioxide. In addition, suitable optical brightener may be employed in the polyolefin layer including those described in *Research Disclosure*, Vol. No. 308, December 1989, Publication 308119, Paragraph V, page 998. For particular applications, the support preferably has an opacity from 80% to 99. Opacity below 80% have a lot of show-thorough and may detract from the viewing of a printed image. Furthermore when indicia is printed on a support with low opacity, the indicia may show through in the image. Opacity great than 99% provide good prints but the added cost in materials has limited added value to the consumer.

In addition, it may be necessary to use various additives such as antioxidants, slip agents, or lubricants, and light stabilizers in the plastic elements as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), and combinations of the above; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl) imino]}(Chimassorb 944 LD/FL).

The indicia useful in the present invention may form a character, or a logo with at least one character. In other useful embodiments, the indicia, such as characters, may comprises at least one member selected from the group consisting of letters, pictures, numbers, symbols, and words. An additional useful embodiment of this invention would be to apply ink or colored material to the embossed indicia, such as a logo, area or to the background area and not the logo area, in order to provide indicia that are easier to view and is less angular dependant when viewing. Such ink or colored solution may be aqueous or solvent-based. The indicia may be engraved on the roller by several means such as laser or mechanical engraving, or chemical etching processes.

The method of the invention comprises a method for placing process survivable indicia on a support for an imaging element comprising providing a support wherein the support comprises a closed cell foam core and adhered thereto at least one flange layer, wherein the closed cell foam core layer comprises a polymer that has been expanded through the use of a blowing agent, and placing process survivable ink on at least one flange layer, wherein the process survivable ink forms the process survivable indicia.

The indicia may be placed on the element in a variety of ways. In one embodiment, the indicia may be placed by ink printing. The indicia may be applied to the web support on either or both the closed cell foam core or on at least one of the flange layers. If the indicia, as applied by a printing ink, is applied to the closed cell foam core, it may be dried and then coated over with a flange layer. In this manner, the flange layer would provide additional protection during hotoprocessing or image generation. If the printing ink is applied to the outer layer of the flange layer coated closed cell foam core, then the ink is open to chemical processing in the case of photographic imaging or subject to physical abrasion in any of the imaging processing methods. In one embodiment of this invention, a process surviving ink that is printed on a non-porous support such as flange layer coated closed cell foam core, may comprise a polymeric binder and a pigment or dye. In general, pigments are preferred over dyes because they are less susceptible to processing chemicals and typically are more resistant to light and UV fading. In imaging techniques that do not expose the print to chemicals, dye may be used. When the indicia is applied to the outer most layer, the polymeric binder of the print ink needs to be resistant to chemical and physical exposure.

The ink may be applied by a variety of printing techniques such as flexographic, gravure, offset, letter press or other methods know in the art. Flexographic printing uses a rubber blank or plates in which an ink (aqueous or solvent) is applied to the blanket or plate and then transfer to the web support. In gravure printing, the ink may be deposited into a relief area on a gravure cylinder by a partial immersion of the roller in the ink. A doctor blade is used to remove excess ink from the non-print areas. The ink then may be transferred directly to the web support or to an immediate transfer roller. A nip under pressure helps to force the ink from the roller to the support. When printing on a non-porous support, such as closed cell foam core or a polymer flange coated layer, there is a need to formulate the ink for proper viscosity and surface tension to assure good release and transfer from the gravure cells, as well as proper wetting and adhesion to the support. Various additives may be required to modify the viscosity and surface tension. Such additives may include surfactants, volatile organics such as alcohols, viscosity modifiers and other materials commonly used in printing or even paint formulations. To aid in the transfer or release of the ink from the print roller or blank, it may be desirable to treat the web to modify it's wetting properties. This may be achieved by corona or plasma treatment of the surface to be printed or by priming the surface to chemical modify it to better accept the ink. these techniques and materials are well known in the art.

In one embodiment, the ink may be aqueous or solvent based. In general, aqueous inks are preferred because of they are more environmentally friendly and are safer to work with. In the printing industry, some aqueous ink may contain small amount of solvent but still be considered or referred to as aqueous inks. On the other hand, solvent-based inks are easier to print and typically are easier to dry. One concern is that, if the inks are not fully dried, a residual solvent may come off over time and interact with the image layers or, in the case when the ink is printed on a closed cell foam core and then covered over with a polymer flange layer such as a melt extruded plastic such as a polyolefin, the high temperature of the polymer at the time of being applied to the closed cell foam core may cause any residual solvent in the ink to flash off, creating steam that would interfere with the adhesion of the melt polymer to the print areas of the closed cell foam core.

Ink formulas used in the printing industry need to provide a variety of functions. In an effort to print on a particular support, the inks needs to provide good adhesion, wear resistances and also have chemical compatibility. Printing inks also need to be formulated and optimize to the printing method in which it is to be applied. For instances, in a gravure printing method the ink formula needs to have its viscosity adjusted for good release from the roller cells. Additionally the ink formula needs to be able to wet the support. This may be accomplished by the addition of solvents, lowering the solids of the formulations or adding addenda such as surfactants. The web support may also be pretreated such as a corona discharge treatment, flame treatment or perhaps priming the web surface to be printed. The inks also have to be pleasing to the viewing in-order to convey a sense of quality. Often the print helps to sell the product it is associated with.

When applying ink to a polymer based non-porous support, such as polypropylene or a pigment-filled polypropylene, the binder selection facilitates good adhesion for both wet and dry processing conditions. When the support to be printed is to be used for imaging, such as in a photographic imaging support, the demands on the ink formula become even greater. If the print indicia is placed on the outer polymer layer, it is exposed to chemical processing conditions such as high and low pH conditions that may cause the ink binder to swell as well as physical abrasion in high speed processing equipment. Often the web is accelerated and decelerated at high rates, web conveyance often steers the web across rollers and other parts of a processor. In general the ink formula needs to survive some very unique conditions.

Another material in the ink formula is the pigment. This is the part of the formula that provides the color to the printed indicia. This needs to provide good color matching and also needs to provide some level of light (UV and visible) stability to the indicia. Pigments are dispersed in the vehicle, which is the liquid portion of the formula, such as water and solvent, that carries them. Generally, ink pigments may be classified as azo, polycyclic, acid dye based basic dye salts and inorganics. Azo materials may include monoazo, disazo, triazo and polyazo. Additional details may be obtained from *The Printing Ink Manual* $3^{rd}$ edition ISBN 7198 2528 8.

Pigments are colorants which are considered to be effectively insoluble in the application medium, and many such compounds are well known and in wide commercial use. Various classes of pigments are classified in the Pigments and Solvent Dyes section of the Color Index International, published by the Society of Dyers and Colorists in 1997, and there are of course many insoluble colorants which are not in this list. It is common practice to provide pigment compositions in the form of finely divided dispersions, which may be produced by well known methods such as ball milling, media milling or by the methods disclosed in U.S. Pat. No. 5,026,427 and U.S. Pat. No. 5,310,778.

Other pigments useful with this invention may include titanium dioxide, zinc based pigments, lead based pigments, antimony oxide, CaCO3, silicas, silicates such as aluminum silicate, natural calcium silicates, sodium aluminosilicates, magnesium silicate, micas, nepheline, magnesium aluminum silicate, and sulfate based pigments, such as BaSO4. Other useful materials may include oxides such as red, yellow, brown, zinc and magnesium ferrite, hydrated chromium oxide and chromic oxide. While these may be used for many imaging application, some care and added evaluation is needed when these and other materials are in photographic application. Some materials may cause photo reactivity with the light sensitive emulsion. Also, pigments may include chromates, such as chrome green, molybdate orange, lead chrome pigments, and cadmium based pigments. Again, some caution is need to assess photo reactivity issues as well as environmental problems. Additional pigments may include ferriferrocyanides, ultramarine pigments, nickel antimony titanate yellow, chrome antimony titanate, cobalt aluminate, manganese violet, manganese antimony, bismuth vanadate, molybdate yellow, nitroso pigments, monoazo based colors, disazo-based colors, disazo condensation pigments, basic-dye based pigments including alkali, quinacridone pigments, carbazole dioxazine, alizarine lake, vat pigments, phthalocanines, isoindoline-based pigments, tetrachloroisoindolinone-based pigments, pyrazoloquinazolone, black pigments such as carbon black, graphite, iron oxide, copper and chrome black, metallic pigments including aluminum flake, gold bronze flake, stainless steel flake, luminescent organic pigments, fluorescent and phosphorescent inorganic pigments. Additional details and information on other useful pigments for this invention may be obtained from *the Pigment Handbook* by Peter Lewis ISBN 0-8155-0811-5. Other useful material may include butanamide, pigment yellow 14, pigment yellow 74, the azo metal complex pigments, hydrocarbyl polypropyleneamine, tetrapropylenepentamine, tallowalkyl tripropylenetetramine, tallowalkyl dipropylenetriamine, cocoalkyl tetrapropylenepentamine, cocoalkyl tripropylenetetramine, cocoalkyl dipropylenetriamine, stearyl tetrapropylenepentamine, stearyl tripropylenetetramine, stearyl dipropylenetriamine, oleyl tetrapropylenepentamine, oleyl tripropylenetetramine, oleyl dipropylenetriamine, lauryl tetrapropylenepentamine, lauryl tripropylenetetramine, lauryl dipropylenetriamine, decyl tetrapropylenepentamine, decyl tripropylenetetramine, decyl dipropylenetriamine, myristyl tetrapropylenepentamine, myristyl tripropylenetetramine, myristyl dipropylenetriamine, palmyl tetrapropylenepentamine, palmyl tripropylenetetramine, palmyl dipropylenetriamine, isodecyl tetrapropylenepentamine, isodecyl tripropylenetetramine, and isodecyl dipropylenetriamine. Suitable organic pigments are, for example, those of the beta-naphthol, Naphthol AS, benzimidazolone, isoindolinone and isoindoline series, also polycyclic pigments for example from the phthalocyanine, quinacridone, perylene, perinone, thioindigo, anthraquinone, dioxazine, quinophthalone and diketopyrrolopyrrole series. Suitable pigments also include solid solutions of the pigments mentioned, mixtures of organic and/or inorganic pigments with organic and/or inorganic pigments such as, for example, carbon black, coated metal, mica or talc pigments, for example, mica CVD-coated with iron oxide, and also mixtures between the pigments mentioned. Other suitable pigments include flaked dyes such as Ca, Mg and Al lakes of sulpho- and/or carboxyl-containing dyes. Pigmented ink may also be purchased from supplier such as Kroma Corporation, Flint Ink, Sun Chemical and others. Whatever pigment is selected needs to be evaluated for overall performance within the photographic system, to assure that it does not leech into processing chemistry, change color, or interact with the photographic or other.

For purposes of the present invention, the term solvent refers to a wide variety of solid, liquid and gaseous substances but for the purpose of this invention, the disclosure will be based mostly on liquid base substances. Ink manufacturers make solutions and dispersions by mixing substances that may not spontaneously intermix on a molecular scale but remain in solution or suspension. For the purpose of a process survivable ink, it is desirable to have an ink that has high film forming properties at a relatively low viscosity, while the solvent must separate from the film and evaporate during drying. Solvents are used to dissolve or disperse solid phase materials in solution so they may be more easily printed and dried.

Ink solvents for printing may be selected from a number of solvents. It should be noted that make-ink formulas are a mixture of solvents and water. In general, if there is more than 50% water in the formula, it is termed water-based or aqueous. Some people also refer to water as a solvent. In the true chemical definition, water is a solvent. In general, solvents with a high hydroxyl content are strongly polar and high dielectric constant, while hydrocarbons and other solvents are non-polar and have a low dielectric constant. Solvents may be use as individually substances or they may be mixed to form co-solvents. Useful solvents must have a good solubility parameter and also an appropriate evaporation rate for the process in which they are used. Slow solvents with low volatility are necessary for printing press stability. The ability to control the rate of evaporation is important. The evaporation rate of a blend varies, based on the components, the concentration and the temperature. Volatility at a given temperature is largely determined by the vapor pressure and the heat of evaporation. It may also be necessary to provide a balance to an ink formula with solvents. In some cases, having an ink formula with a constant boiling temperature (azeotrope) may be desirable. Useful solvents may include, but are not limited to, aliphatic hydrocarbons, aromatic hydrocarbons such as benzene, toluene, xylene, napthhenic, monohydric alcohol, alipatic and alicyclic, glycol, glycol ether, ketone and esters. Typical alcohols include methyl, ethyl, propyl,butanols and their derivatives. Useful glycols include ethylene, propylene, hexlene, diethylene, dipropylene, triethylene and glycerine. Glycol ethers includes methylene glycol, methyl cellosolve, ethylene glycol, cellosolve, butyl glycol, butyl cellosolve, butyl digol and butyl carbitol and their derivatives. Ketones based materials include acetone, dimethyl ketone, methyl ethyl ketone, methyl iso-butyl ketone, cyclohexanone, isophorone, diacetone alcohol and mixtures thereof. Esters may include ethyl acetate, isopropyl acetate, n-butyl acetate.

Additionally, it may be necessary to add plasticizers to provide dried ink flexibility. These materials may also minimize the binder polymer from forming a surface skin during drying and trapping solvent in the print area. Useful plasticizers may include dibutyl phthalate, triethyl citrate or cyclohexanol phthalate. Additional materials may be found *Raw Materials Data Handbook* Volume 2 from the National Printing Ink research Institute. To improve wear resistance, improve slip and provide water repellency in the print area, it may be desirable to add waxes to the formulation. Useful waxes may include polyethylene waxes, polytetrafluoroethylene, fatty amides, halogenated hydrocarbon waxes, natural waxes, petroleum waxes.

In another embodiment of this invention, the indicia may be applied to at least one flange layer by embossing the indicia. This may include mechanical embossing in which the indicia comprises at least a background area and some form of indicia. In this case, there is a height, roughness and gloss difference between the background and the indicia areas. In mechanical embossing, the indicia is pressed into the flange layer or support by pressure and, perhaps, temperature to help soften the polymer. In a melt replication embossing, a chill cylinder roll, disposed inline and furnished with etched or engraved indicia, such as patterns or symbols, on its surface, is employed during extrusion coating, whereby the pattern of indicia, to be embossed in the back side polymer flange layer, is characterized by an increase in height or, alternatively, a decrease in height of the surface level in certain areas of the chill cylinder roll, and which is further distinguished, as compared to the remaining cylinder-roll surface, by a different gloss. The melt polymer is extruded onto the core material or into a nip formed by a chill roller with the indicia, the molten fluid polymer, the support or core material and an opposing pressure roller. In this case, the somewhat fluid polymer conforms to the indicia relief areas and the background, thereby leaving a replication of the indicia pattern in the polymer flange layer when it solidifies. Since there is a roughness difference between the indicia and the background, the indicia may be viewed under spectral lighting conditions because of the gloss difference between the two areas. The embossed indicia may be further treated with ink or a colored solution to create special effects. In another embodiment, the indicia may be placed by ink printing using aqueous or solvent-based ink. In another embodiment, the placing of indicia may be by embossing.

The present invention includes a method for placing indicia on a support for an imaging element comprising providing a support wherein the support comprises a closed cell foam core and adhered thereto an upper flange layer and a lower flange layer, wherein the closed cell foam core comprises a polymer that has been expanded through the use of a blowing agent, and placing indicia on at least one of the upper and lower flange layer.

The present invention also includes a method for placing indicia on a support for an imaging element comprising providing a support comprising a support wherein the support comprises a closed cell foam core sheet and adhered thereto at least one flange layer, wherein the closed cell foam core sheet comprises a polymer that has been expanded through the use of a blowing agent, and placing indicia on the closed cell foam core. In a preferred embodiment, a flange layer is adhered over the indicia on the closed cell foam core.

Used herein, the phrase 'imaging element' comprises an imaging support as described above along with an image receiving or imaging layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images.

The thermal dye image-receiving layer of the receiving elements used with the invention may comprise, for example, a polycarbonate, a polyurethane, a polyester, polyvinyl chloride, poly(styrene-co-acrylonitrile), poly (caprolactone), or mixtures thereof. The dye image-receiving layer may be present in any amount that is effective for the intended purpose. In general, good results have been obtained at a concentration of from 1 to 10 $g/m^2$. An overcoat layer may be further coated over the dye-receiving layer, such as described in U.S. Pat. No. 4,775,657 of Harrison et al.

Dye-donor elements that are used with the dye-receiving element used in the invention conventionally comprise a support having thereon a dye containing layer. Any dye may be used in the dye-donor in the invention, provided it is transferable to the dye-receiving layer by the action of heat. Especially good results have been obtained with sublimable dyes. Dye donors applicable for use in the present invention are described, for example, in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads which may be used to transfer dye from dye-donor elements to receiving elements used in the invention are available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage useful with the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary support, and fixing the image to the support. There are numerous variations in these processes and basic steps; the use of liquid toners in place of dry toners is simply one of those variations.

The first basic step, creation of an electrostatic image, may be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other support). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fuisible toners, thermoplastic polymers are used as part of the particle. Heating both removes residual liquid and fixes the toner to paper.

When used as ink jet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, may be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer may be used in combination with the external polyester-based barrier layer for use with the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the support and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer may be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer may also protect the ink receiving layer from abrasion, smudging, and water damage. In general, this overcoat layer may be present at a dry thickness of 0.1 to 5 μm, preferably 0.25 to 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, and light stabilizers. In addition, a mordant may be added in small quantities (2%–10% bv weight of the base layer) to improve water-fastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, and curtain coating. Some of these methods allow for simultaneous coatings of both layers, which is preferred from a manufacturing economic perspective.

The DRL (dye receiving layer) is coated over the tie layer or TL at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. No. 4,879,166; 5,264,275; 5,104,730; 4,879,166, and Japanese Patents 1,095,091; 2,276,671; 2,276,670; 4,267,180; 5,024,335; and 5,016,517 disclose aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. No. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based DRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, and light stabilizers.

Although the ink-receiving elements as described above may be successfully used to achieve the objectives of the present invention, it may be desirable to overcoat the DRL for the purpose of enhancing the durability of the imaged element. Such overcoats may be applied to the DRL either before or after the element is imaged. For example, the DRL may be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, and humectants. Inks preferred for use in combination with the image recording elements useful with the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque paper supports are useful in combination with silver halide images because the contrast range of the silver halide image is improved, and show through of ambient light during image viewing is reduced. The preferred photographic element useful with this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to $100\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. This invention, in a preferred embodiment, utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \quad (I)$$

wherein n is zero, -1, -2, -3, or -4; M is a filled frontier orbital polyvalent metal ion, other than iridium; and $L_6$ represents bridging ligands which may be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand. Preferred photographic imaging layer structures are described in EP Publication 1 048 977. The photosensitive imaging layers described therein provide particularly desirable images on the support used in this invention.

This invention may also be directed towards a photographic recording element comprising a support and at least one light sensitive silver halide emulsion layer comprising silver halide grains as described above.

The following examples illustrate the practice of this invention. They are not intended to be exhaustive of all possible variations of the invention. Parts and percentages are by weight unless otherwise indicated.

The following examples are provided to illustrate the invention.

EXAMPLES

Four water-based inventive ink formulations, and two water-based comparative ink formulations were prepared for coating on the polypropylene surface of several support materials. Comparative inks A and B contain 9.4% by weight pigmented colorants (A- black pigment, referred to hereinafter as grey ink; B- Pigment Yellow 14 and Pigment Yellow 74 referred to hereinafter as yellow ink) and 90.6% by weight polymeric binder comprised of styrene, alpha-methylstyrene, butyl methacrylate and methyl methacrylate.

Inventive inks 1 and 3 contain the same pigments in the amount of 3.6% by weight found in inks A and B respectively, and 96.4% polymeric binder composed of styrene, methyl methacrylate and 2-ethylhexyl acrylate.

Inventive inks 2 and 4 were formulated using NeoCryl 5090 as a polymeric binder additive to Comparative inks A and B respectively, as described below.

NeoCryl 5090, a water dispersible acrylic copolymer comprising methyl methacrylate, n-butyl acrylate and n-butyl methacrylate and the crosslinker CX100 a polyfunctional aziridene, were obtained from NeoResins (a division of Avecia).

Continuous hand coatings of the inks with and without added NeoCryl 5090 were made to study the effect of added NeoCryl 5090 on the photoprocessing survivability of the inks. All coatings were made using a 0.5 mil knife on the appropriate substrate as shown in Table 1 below. The NeoCryl 5090 containing coatings were crosslinked using 1.5–5 wt % CX100 with respect to the binder The NeoCryl 5090/ink ratio was 95:5 for the grey ink (61808) and 50:50 for the yellow inks(61807). By ink, is meant the ink and the binder it comes with. The total dry coverage of the ink coatings with and without added polymer was 2.15 g/m$^2$.

The photo processing was simulated at 35C by immersing strips of the coated sample in a pH 10 buffer for 45 sec followed by a pH4 buffer for 45 sec and a water wash for 90 sec. The red green and blue densities of the strips were measured before and after processing to follow the dye washing out of the coating, and appeared below in Table 1.

TABLE 1

Optical Densities of Inks -Pre and Post Processed

| Ink | Binder: NeoCryl A 5090/ | Support | Preprocess/Post process Density Red | Preprocess/Post process Density Green | Preprocess/Post process Density Blue |
|---|---|---|---|---|---|
| A | 0 | K | 0.21/0.09 | 0.21/0.08 | 0.16/0.09 |
| A | 0 | P | 0.17/0.06 | 0.18/0.06 | 0.10/0.03 |
| 1 | 0 | K | 0.26/0.28 | 0.25/0.26 | 0.20/0.21 |
| 1 | 0 | P | 0.23/0.21 | 0.22/0.21 | 0.15/0.15 |
| 2 | Y | K | 0.15/0.16 | 0.14/0.15 | 0.12/0.12 |
| 2 | Y | P | 0.12/0.11 | 0.13/0.12 | 0.07/0.07 |
| B | 0 | K | 0.16/0.1 | 0.31/0.09 | 0.69/0.13 |
| B | 0 | P | 0.13/0.06 | 0.26/0.06 | 0.63/0.06 |
| 3 | 0 | K | 0.15/0.15 | 0.31/0.31 | 0.78/0.78 |
| 3 | 0 | P | 0.10/0.11 | 0.24/0.28 | 0.60/0.73 |
| 4 | Y | K | 0.15/0.14 | 0.27/0.25 | 0.63/0.60 |
| 4 | Y | P | 0.11/0.10 | 0.23/0.25 | 0.55/0.62 |

K = Low Density Core Support -Polypropylene side in
P = 33% 843, 67% 4002P, Rawstock Paper Core- Coated Polypropylene side in All samples coated on the polypropykene side of the supports.

TABLE 2

Process Survivability of Inks

| Ink | Binder: NeoCryl A 5090/ | Support | Process Survivability: Red | Process Survivability: Green | Process Survivability: Blue |
|---|---|---|---|---|---|
| A(Control) | 0 | K | -0.12 | -0.13 | -0.15 |
| A(Control) | 0 | P | -0.11 | -0.12 | -0.07 |
| 1 | 0 | K | 0.02 | 0.01 | 0.01 |
| 1 | 0 | P | -0.02 | -0.01 | 0.0 |

TABLE 2-continued

Process Survivability of Inks

| Ink | Binder: NeoCryl A 5090/ | Support | Process Survivability: Red | Process Survivability: Green | Process Survivability: Blue |
|---|---|---|---|---|---|
| 2 | Y | K | 0.01 | 0.01 | 0.0 |
| 2 | Y | P | −0.01 | −0.01 | 0.0 |
| B(Control) | 0 | K | −0.06 | −0.22 | −0.56 |
| B(Control) | 0 | P | −0.07 | −0.20 | −0.57 |
| 3 | 0 | K | −0.0 | −0.0 | −0.0 |
| 3 | 0 | P | 0.01 | 0.04 | 0.07 |
| 4 | Y | K | −0.01 | −0.02 | −0.03 |
| 4 | Y | P | −0.01 | 0.02 | 0.07 |

The process survivability is defined as the difference between the optical densities of post-processed minus the optical density of the inks pre-processed inks. Inks which are removed during processing demonstrate a more negative density value, as a result of removal of the ink.

As can be seen from the preprocess and post-process color densities of Table 2, when the binder polymer is more hydrophobic than a butyl polymer, that is, has more than 4 carbon units, as demonstrated by Samples 1 and 3, there is little or no color density loss after exposing the ink to the acid and base conditions. As can also be seen from the preprocess and post-process color densities of Table, when the binder to pigment ratio is greater than 95/5. Samples 2 and 4, a less hydrophobic polymer may be resistant to the processing conditions.

The invention has been described in detail with particular reference to certain preferred embodiments thereof, but it will be understood that variations and modifications can be effected within the spirit and scope of the invention.

What is claimed is:

1. A method for placing process survivable indicia on a support for an imaging element comprising providing a support wherein the support comprises a closed cell foam core and adhered thereto at least one flange layer, wherein the closed cell foam core layer comprises a polymer that has been expanded through the use of a blowing agent, and placing process survivable ink on said at least one flange layer, wherein said process survivable ink forms said process survivable indicia.

2. The method of claim 1 wherein said process survivable ink comprises a pigment and a polymeric binder.

3. The method of claim 2 wherein the binder to pigment weight percent ratio is greater than 95:5.

4. The method of claim 2 wherein said ink further comprises solvents.

5. The method of claim 4 wherein said solvents comprise at least one member selected from the group consisting of methyl alcohol, ethyl alcohol, propyl alcohol, butanol alcohol, glycol ethers including methylene glycol, methyl cellosolve, ethylene glycol, cellosolve, butyl glycol, butyl cellosolve, butyl digol and butyl carbitol and their derivatives, ketones including acetone, dimethyl ketone, methyl ethyl ketone, methyl iso-butyl ketone, cyclohexanone, isophorone, diacetone alcohol, esters including ethyl acetate, isopropyl acetate, n-butyl acetate, and derivatives and combinations thereof.

6. The method of claim 2 wherein said ink further comprises plasticisers.

7. The method of claim 2 wherein said ink further comprises waxes.

8. The method of claim 2 wherein said polymeric binder comprises 20–90 weight percent recurring monomer units derived from oleophilic monomers, wherein said monomers comprise alpha, beta-ethylenically unsaturated hydrocarbon groups, and wherein said recurring oleophilic monomer units comprise alkylene side chains having greater than 4 carbon atoms.

9. The method of claim 8 wherein the binder to pigment weight percent ratio is greater than 90:10.

10. The method of claim 1 wherein said closed cell foam core comprises polyolefin polymer.

11. The method of claim 10, wherein said polyolefin polymer comprises polypropylene.

12. The method of claim 1 wherein said closed cell foam core has a thickness of from 25 to 350 μm.

13. The method of claim 1 wherein the modulus of said closed cell foam core comprises from 30 MPa to 1000 MPa.

14. The method of claim 1 wherein the modulus of said flange layers comprises from 700 MPa to 10500 MPa.

15. The method of claim 1 wherein said flange layers are integral with said closed cell foam core.

16. The method of claim 1 wherein said at least one flange layer has an opacity of from 80 to 99 percent.

17. The method of claim 1 wherein said at least one flange layer has an opacity greater than 90 percent.

18. The method of claim 1, wherein said at least one flange layer further comprises pigment.

19. The method of claim 1, wherein said at least one flange layer further comprises talc.

20. The method of claim 1, wherein said at least one flange layer further comprises titanium dioxide pigment.

21. The method of claim 1 wherein said upper flange layer comprises paper.

22. The method of claim 21 wherein said paper flange layer comprises a caliper from 25 μm to 100 μm.

23. The method of claim 21 wherein said paper flange layer comprises a caliper from 30 μm to 70 μm.

24. The method of claim 21 wherein said upper flange layer comprises paper and wherein said lower flange layer comprises paper.

25. The method of claim 1 wherein said lower flange layer comprises paper.

26. The method of claim 25 wherein said paper flange layer comprises a caliper from 25 μm to 100 μm.

27. The method of claim 25 wherein said paper flange layer comprises a caliper from 30 μm to 70 μm.

28. The method of claim 1 wherein said flange layers comprise polymer layers.

29. The method of claim 28, wherein said at least one flange layer comprises an oriented layer.

30. The method of claim 29 wherein said polymer layers comprise biaxially oriented polyolefin layers.

31. The method of claim 28 wherein said polymer flange layers comprise a caliper from 10 μm to 175 μm.

32. The method of claim 28 wherein said polymer flange layers comprise a caliper from 35 μm to 70 μm.

33. The method of claim 1 wherein said support has opacity from 80% to 99%.

34. The method of claim 1 wherein said support has a thickness of from 100 to 400 μm.

35. The method of claim 1 wherein the upper surface of said support has an average roughness of from 0.1 μm to 1.1 μm.

36. The method of claim 1 wherein the weight of said imaging member comprises less than 75% by weight of raw paper.

37. The method of claim 1 wherein the weight of said imaging member comprises less than 50% by weight of raw paper.

38. The method of claim 1 wherein said imaging member comprises at least one layer comprising photosensitive silver halide.

39. The method of claim 1 wherein said imaging member comprises an ink jet receiving member.

40. The method of claim 1 wherein said imaging member comprises a thermal dye receiving member.

41. The method of claim 1 further comprising polyethylene resin coatings on each side of said support.

42. The method of claim 1 wherein said imaging element comprises an electrophotographic element.

43. The method of claim 1 wherein said placing indicia on said at least one flange layer comprises ink printing.

44. The method of claim 43 wherein said ink printing comprises aqueous ink.

45. The method of claim 43 wherein said ink printing comprises solvent-based ink.

46. The method of claim 43 wherein said placing indicia on said at least one flange layer comprises embossing.

47. The method f claim 1 further comprising overcoating said indicia with at least one overcoat layer, wherein said at least one overcoat layer comprises a layer permeable to processing solutions.

48. A method for placing process survivable indicia on a support for an imaging element comprising providing a support wherein said support comprises a closed cell foam core and adhered thereto an upper flange layer and a lower flange layer, wherein said closed cell foam core comprises a polymer that has been expanded through the use of a blowing agent, and placing process survivable indicia on at least one of said upper and lower flange layer.

49. The method of claim 48 wherein said upper and lower flange layers have a modulus greater than the modulus of the closed cell foam core.

50. The method of claim 48 wherein said process survivable ink comprises a pigment and a polymeric binder.

51. The method of claim 50 wherein the binder to pigment weight percent ratio is greater than 95:5.

52. The method of claim 50 wherein said polymeric binder comprises 20–90 weight percent recurring monomer units derived from oleophilic monomers, wherein said monomers comprise alpha, beta-ethylenically unsaturated hydrocarbon groups, and wherein said recurring oleophilic monomer units comprise alkylene side chains having greater than 4 carbon atoms.

53. The method of claim 52 wherein the binder to pigment weight percent ratio is greater than 90:10.

54. The method of claim 48 further comprising overcoating said indicia with at least one overcoat layer, wherein said at least one overcoat layer comprises a layer permeable to processing solutions.

55. A method for placing process survivable indicia on a support for an imaging element comprising providing a support comprising a support wherein said support comprises a closed cell foam core sheet and adhered thereto at least one flange layer, wherein said closed cell foam core sheet comprises a polymer that has been expanded through the use of a blowing agent, and placing process survivable indicia on said closed cell foam core.

56. The method of claim 55 further comprising adhering at least one flange layer to said indiciaed closed cell foam core.

57. The method of claim 55 wherein said process survivable ink comprises a pigment and a polymeric binder.

58. The method of claim 57 wherein the binder to pigment weight percent ratio is greater than 95:5.

59. The method of claim 57 wherein said polymeric binder comprises 20–90 weight percent recurring monomer units derived from oleophilic monomers, wherein said monomers comprise alpha, beta-ethylenically unsaturated hydrocarbon groups, and wherein said recurring oleophilic monomer units comprise alkylene side chains having greater than 4 carbon atoms.

60. The method of claim 59 wherein the binder to pigment weight percent ratio is greater than 90:10.

61. The method of claim 55 further comprising overcoating said indicia with at least one overcoat layer, wherein said at least one overcoat layer comprises a layer permeable to processing solutions.

* * * * *